United States Patent
Neuendorffer et al.

(10) Patent No.: US 11,651,127 B2
(45) Date of Patent: May 16, 2023

(54) PLACEMENT OF LOGIC BASED ON RELATIVE ACTIVATION RATES

(71) Applicant: Xilinx, Inc., San Jose, CA (US)

(72) Inventors: Stephen Andrew Neuendorffer, San Jose, CA (US); Jianyi Cheng, London (GB)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 17/399,523

(22) Filed: Aug. 11, 2021

(65) Prior Publication Data
US 2023/0050757 A1  Feb. 16, 2023

(51) Int. Cl.
*G06F 30/323* (2020.01)
*G06F 30/343* (2020.01)
*G06F 115/06* (2020.01)

(52) U.S. Cl.
CPC .......... *G06F 30/323* (2020.01); *G06F 30/343* (2020.01); *G06F 2115/06* (2020.01)

(58) Field of Classification Search
CPC ... G06F 30/323; G06F 30/343; G06F 2115/06
See application file for complete search history.

(56) References Cited

U.S. PATENT DOCUMENTS

9,449,131 B2   9/2016  Han et al.
9,710,584 B1   7/2017  Hao et al.
9,824,172 B1  11/2017  Hao et al.

*Primary Examiner* — Jack Chiang
*Assistant Examiner* — Aric Lin
(74) *Attorney, Agent, or Firm* — Crawford Maunu PLLC (57) ABSTRACT

Approaches for placing logic of a circuit design include determining respective relative activation rates of control paths in a high-level language (HLL) program by a design tool. The HLL program specifies a circuit design. The design tool compiles the HLL program into logic functions and determines respective relative activation rates of signal connections between the logic functions based on the relative activation rates of the control paths in the HLL program. The design tool selects placement locations on an integrated circuit device for the logic functions using a placement cost minimization function that factors the relative activation rates of the signal connections into placement costs.

20 Claims, 5 Drawing Sheets

PLACEMENT OF LOGIC BASED ON RELATIVE ACTIVATION RATES

TECHNICAL FIELD

The disclosure generally relates to placing logic elements of a circuit design.

BACKGROUND

High-level synthesis (HLS) involves the translation of high-level language (HLL) program code into a hardware description language (HDL) specification. HLLs allow designers to specify functions in a more abstract manner than do HDLs. Also, HLS can be used to translate selected HLL functions into hardware in order to accelerate those functions and improve performance. In translating HLL functions into a hardware specification and then into hardware, the resulting hardware often employs task/dataflow pipelines that exploit parallelism and increase throughput. These task/dataflow pipelines can include sub-circuits that buffer handshake signals to coordinate operations in the stages of the pipeline. Exemplary handshake signals include a data signal(s), a valid signal, and an acknowledge signal.

The performance of a circuit is significantly influenced by the placement of logic and routing of signals performed in the implementation flow on the design specification of the circuit. In a synchronous design, buffers may be inserted to increase the clock frequency of the design and achieve timing closure. In an asynchronous design (e.g. delay-insensitive or quasi-delay-insensitive technology), buffers may be necessary to limit the relative skew between data and handshake wires due to on-chip and off-chip process variation on long paths. In an asynchronous programmable device (e.g., one having field programmable gate array (FPGA) circuitry), some long routes may be inevitable in a particular design due to routing constraints. The longer routes inherently include additional buffers and introduce delay due to the device architecture and can negatively affect performance.

SUMMARY

A disclosed method includes determining respective relative activation rates of control paths in a high-level language (HLL) program by a design tool. The HLL program specifies a circuit design. The method includes compiling the HLL program into logic functions by the design tool and determining respective relative activation rates of signal connections between the logic functions based on the relative activation rates of the control paths in the HLL program. The method further includes selecting placement locations on an integrated circuit device for the logic functions using a placement cost minimization function that factors the relative activation rates of the signal connections into placement costs.

A disclosed system includes one or more processors and a memory arrangement coupled to the processor(s). The memory arrangement is configured with instructions that when executed by the one or more processors cause the one or more processors to implement an electronic design automation (EDA) tool that performs operations that include determining respective relative activation rates of control paths in a high-level language (HLL) program. The HLL program specifies a circuit design. The operations further include compiling the HLL program into logic functions by the design tool, and determining respective relative activation rates of signal connections between the logic functions. The respective relative activation rates of the signal connections are determined based on the relative activation rates of the control paths in the HLL program. The operations further include selecting placement locations on an integrated circuit device for the logic functions using a placement cost minimization function that factors the relative activation rates of the signal connections into placement costs.

Other features will be recognized from consideration of the Detailed Description and Claims, which follow.

BRIEF DESCRIPTION OF THE DRAWINGS

Various aspects and features of the methods and systems will become apparent upon review of the following detailed description and upon reference to the drawings in which.

DETAILED DESCRIPTION

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

A conditional branch in an HLL specification can be realized in an integrated circuit device by logic in which alternative signal wires are activated in response to evaluation of one or more signals that implement the condition of the branch. Examples of conditional branches in an HLL include loops, if-then statements, if-then-else statements, switch statements etc. The implementation of a conditional branch statement as a circuit can include control logic that activates a signal(s) on one of N possible paths in response to a set of selection signals.

The realization of conditional branches in HLL specifications in a circuit design can involve handshaking between source and destination logic. A handshaking protocol can be used when data is communicated from a source to a destination over a wire in a circuit design. For example, the source can assert a valid signal to indicate that data is present on the wire, and the destination can assert an acknowledge ("ack") signal to indicate that the data has been received. It will be recognized that the disclosed approaches are applicable to other handshake protocols.

The distance separating a particular source and destination in a placed circuit design can significantly impact performance, which can be exemplified by handshaking in a circuit targeted to an integrated circuit device having an asynchronous architecture (e.g., an FPGA). During placement of source and destination logic on an asynchronous device, larger spacing between the source and destination implicitly involves more circuitry (e.g., registers, logic circuits, or asynchronous buffers) to buffer the data, valid, and acknowledge handshake signals than would smaller spacing between the source and destination. The greater number of registers results from the greater number of routing switches between the source and destination. The path between each pair of connected circuitry that buffers a handshake signal in the path between the source and destination is implicitly a separate handshake. Thus, the number of handshakes is proportional to the latency in communicating data from the source destination.

The latency of a handshake signal path can be compounded in a scenario in which the handshake path is cyclically activated. The overall throughput of the system can be negatively impacted if the handshake path is activated often enough. For example, a handshake signal path can be part of the circuitry that implements a loop from an HLL specification. A handshake path involved in implementing a loop that iterates a greater number of times will introduce a greater latency than a handshake path involved in implementing a loop that iterates a fewer number of times.

According to the disclosed approaches, relative activation rates on signal paths of a circuit are used in an implementation flow on a circuit design to place logic of the circuit design at locations on an integrated circuit device. A greater relative activation rate on a signal path from a source logic element ("source" for brevity) to a destination logic element ("destination" for brevity) guides placement of the source and destination to be nearer to one another than would a lesser relative activation rate.

The disclosed approaches can be applied to designs targeted to IC devices having an asynchronous architecture (e.g., an FPGA), as well as to synchronous designs. When the circuit design is targeted to an integrated circuit device having an asynchronous architecture (e.g., an FPGA), relative activation rates can be provided to the placement process, which can use the relative activation rates to determine suitable placement locations as indicated above.

In a synchronous design, registers that buffer signals between logic can be moved. However, the number of registers between the logic cannot be arbitrarily modified. Some tools recognize annotations that indicate to the tool some level of elasticity regarding the insertion/removal of register on a path. So relative to the disclosed approaches using relative activation rates to place logic functions, the design tool can space connected logic functions farther apart and insert additional buffer registers if permitted and needed, which may allow a different pair of logic functions to be spaced closer together.

Figure 1:
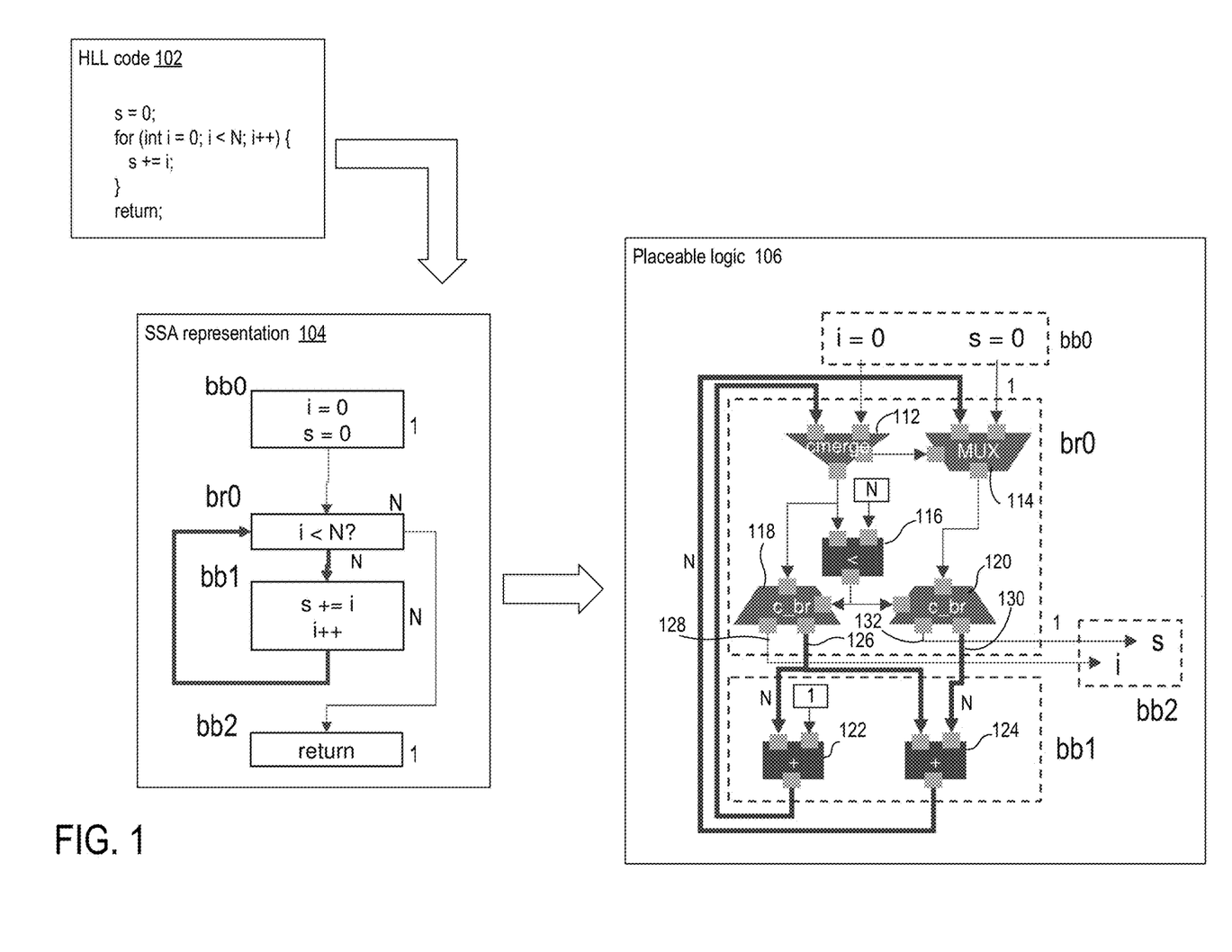
FIG. 1 shows a flow diagram that illustrates the transformation of exemplary high-level language (HLL) program code into placeable logic, and the association of relative activation rates with signal paths between logic elements.

FIG. 1 shows a flow diagram that illustrates the transformation of exemplary high-level language (HLL) program code into placeable logic, and the association of relative activation rates with signal paths between logic elements. The flow is a transformation from the HLL program code 102 into static single assignment (SSA) form 104, and from SSA form into the placeable logic 106. Relative activation rates of control paths in the code can be propagated in the implementation flow to eventually determine relative activation rates of signal paths, which can then be used in guiding placement of logic functions of a circuit design.

The HLL code 102 shows a loop. The number of times the body of the loop is executed is controlled by the loop control, (i=0; i<N; i++). As i is initialized to 0 and increments by one with each iteration, the body of the loop will be executed N times. The loop control directs execution to the statement s+=1, or to the return statement, depending on the value of i relative to N. Thus, control will be directed to increment s N times, and control will be directed to return once. The "trip count" of a loop is the number of times the loop iterates during the execution of a program.

Conditional branches, such as the loop control in the HLL code 102, can have deterministic behavior. The trip count can be determined by extracting loop constants. For HLL controls whose behavior is not deterministic, trip counts can be determined by profiling execution of the program code, from annotations on the HLL controls, or from an assumed trip count (e.g., 10). An assumed trip count may be sufficient for guiding placement as a loop is likely to be executed multiple times and exited once. The annotations can be in the form of comments or pragma directive that indicate trip counts or data that indicate relative likelihoods of following alternative execution paths. Similar approaches can be used to determine trip counts for execution paths of if-then statements, if-then-else statements, switch statements etc.

An implementation flow that processes the HLL code 102 into data that can be used to implement a circuit on a target integrated circuit device can include compiling the HLL code into SSA representation 104. The SSA representation 104 of the HLL specification 102 includes basic blocks bb0, bb1, and bb2, and branch control br0. A basic block is a sequence of instructions having one and only one entry point and one and only one exit point. A branch control is an instruction that directs that execution follow one of multiple alternative paths. The control flow between the basic blocks and branch control of the SSA representation 104 is represented by directed edges.

The basic blocks and branch block can be annotated with respective relative activation rates, which can be determined based on the trip counts determined from the HLL code or from analysis of the SSA representation. The relative activation rate of the entry block of a function is 1. For example, if the HLL code 102 was encapsulated in an HLL function, an initial block that immediately precedes the first basic block or branch control of that function would have a relative activation rate of 1.

The relative activation rate of basic block bb0 is 1. The relative activation rate of branch control br0 is N (where N=N−1+1). The relative activation rate of the body of a loop is the relative activation rate of the basic block preceding the loop times the loop trip count. Thus, the relative activation rate of the basic block bb1, which represents the loop body, is N (where N=1*(N−1+1)). The relative activation rate of the successor block of a loop is the relative activation rate of the basic block preceding the loop. Thus, the relative activation rate of basic block bb2 is 1.

The relative activation rates of alternative basic blocks that are destinations of a branch control resulting from an if-then, if-then-else, or switch statement in the HLL code (not shown) can be determined based on the probabilities that the alternative branches will be executed. For example, the relative activation rate of one of the branch destination blocks can be the relative activation rate of the predecessor basic block of the conditional statement multiplied by the probability of the branch executing. The relative activation rate of the successor block of the conditional statement is the same as the relative activation rate of the basic block immediately preceding the branch block representing the conditional statement.

In compiling the SSA representation 104 into placeable logic 106 by the design tool, the relative activation rates of the basic blocks and branch controls can be carried forward as annotations associated with the logic functions that implement those blocks and controls. The placeable logic includes logic functions that can be placed on a target integrated circuit. For ease of reference, the basic blocks of the SSA representation 104 are shown as blocks having dashed lines and corresponding labels in the placeable logic.

Basic block bb0 can comprise registers (not shown) that input the initial value of 0 for both i and s. Branch control br0 includes cmerge (conditional merge) logic 112, mux logic 114, comparison logic 116, and c_br (conditional branch) logic 118 and 120. The branch control br0 can also include a register for input of the value of N. Basic block bb1 can include adder logic 122 and 124 and a register that inputs the constant value 1. Basic block bb2 can include registers (not shown) that store the values of s and i.

The cmerge logic 112 selects between the initial input value of i and the feedback value of i as it is incremented in iterations of the loop. The cmerge logic also controls the mux logic 114 to select between the initial input value of s and the value of s as s is increased by the value of i in each iteration of the loop.

The comparison logic 116 compares the value of i selected by the cmerge to the value of N and provides a control signal to c_br logic 118 and 120. The c_br logic 118 asserts signal lines to provide the value of i, either to both adder logic 122 and 124 or as output. The c_br logic 120 asserts signal lines to provide the value of s, either to adder logic 124 or as output. The adder logic 122 increments the value of i by one, and adder logic 124 adds the current value of i to the current value of s.

The relative activation rates annotated on the basic blocks and branch controls and the particular functions of the constituent logic functions can be used to determine the relative activate rates of the signals output from the logic functions.

In implementing the handshake circuits that carry the output signals from the logic functions (excepting conditional merge logic (cmerge), conditional branch logic (c_br) and mux logic), the relative activation rates of the outputs from the logic functions are the same as the relative activation rate of the basic block. For example, the relative activation rates of the output signals from the circuitry of bb0 are 1, and the relative activation rates of the output signals from the adder logic 122 and 124 are N.

The relative activation rates of outputs from conditional merge logic (cmerge), conditional branch logic (c_br) and mux logic are determined by the relative activation rates of the corresponding destination blocks. For example, the relative activation rates of the output from cmerge logic 112, mux logic 114, and comparison logic 116 are N, because the outputs are not conditional and basic block bb1 is assumed to have a greater relative activation rate (N) than basic block bb2 (1). The outputs of c_br logic 118 and 120, however, are conditional based on the signal from comparison logic 116, and the relative activation rates of the outputs of c_br 118 and 120 are the relative activation rates of bb1 and bb2. Specifically, the relative activation rate of output signals 126 from c_br 118 is N, and the relative activation rate of the output signals 128 is 1. Similarly, the relative activation rate of output signals 130 from c_br 120 is N, and the relative activation rate of the output signals 132 is 1.

Figure 2:
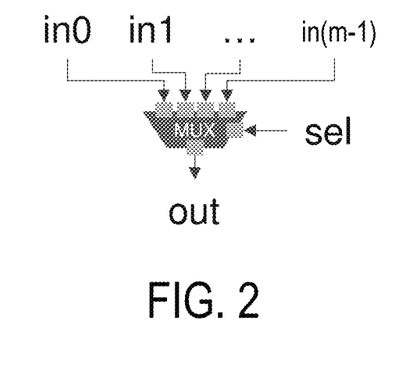
FIG. 2 shows input signal paths and an output signal path to/from mux logic.

FIG. 2 shows input signal paths and an output signal path to/from mux logic. The mux logic selects one of m alternative signal connections (inputs in0-in(m-1)) for output. The relative activation rate of the output is the relative activation rate of the basic block to which the output is connected.

Figure 3:
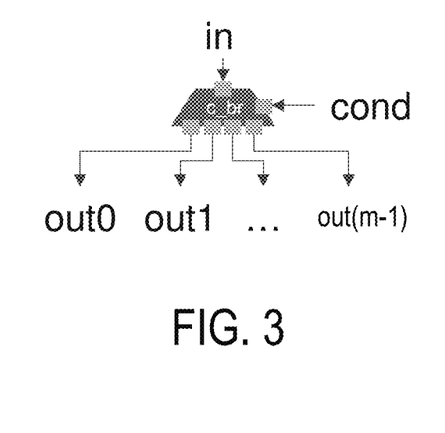
FIG. 3 shows input signal paths to and output signal paths from conditional branch logic.

FIG. 3 shows input signal paths to and output signal paths from conditional branch logic. The conditional branch logic can implement a sequence of if-then-else HLL statements, for example. The conditional branch logic has one input and m alternative output signal connections (out0-out(m-1)). One of the m alternative outputs can be activated in response to the state of the "cond" signal provided to the conditional branch logic. It will be recognized that conditional branch logic can also implement a loop control as in the example of FIG. 1.

For loop control, the relative activation rates of the two alternative outputs can be 1 and N as in the example of FIG. 1. For if-then and if-then-else statements, the relative activation rates of the m alternative outputs can be based on the respective probabilities of executing the alternative execution paths. The respective probabilities can be determined from profiling execution of the HLL program code, for example.

The respective relative activation rates of the execution paths (e.g., destination blocks of the SSA specification) can be the product of the relative activation rate of the predecessor block of the if block and the respective probability of executing the alternative execution path of the alternative block. Thus, the respective relative activation rate of out-i, for $0 \leq i \leq m-1$, is the produce of relative activation rate of the predecessor block and the probability associated with the execution path implemented by out-i.

Figure 4:
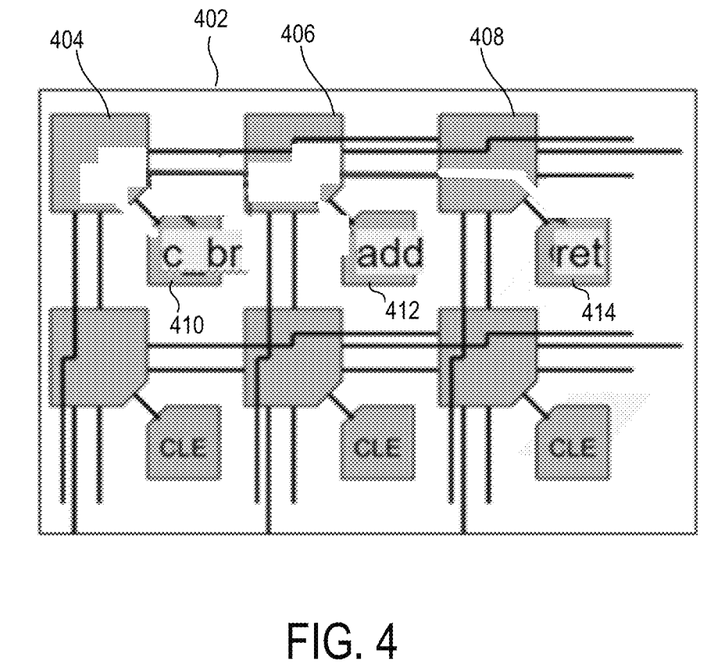
FIG. 4 shows a partial placement of the logic from the example of FIG. 1 on a portion of an exemplary integrated circuit device.

FIG. 4 shows a partial placement of the logic from the example of FIG. 1 on a portion of an exemplary integrated circuit device 402. The exemplary IC device is an FPGA having configurable routing circuits and configurable logic elements. Blocks 404, 406, and 408 are examples of the configurable routing circuits, and blocks 410, 412, and 414 are examples of configurable logic elements.

The exemplary placement shows how the relative activation rates can guide placement of exemplary ones of the logic elements of FIG. 1. Specifically, the relative activation rate (N) of the output from c_br logic 118 to adder logic 124 is greater than the relative activation rate (1) of the output from c_br logic 118 to bb2, which outputs values of s and i. The relative activation rates guide placement of the adder logic on configurable logic element 412, which is nearer to the placement of c_br logic on configurable logic element 410 than the placement of bb2 logic (labeled "ret") on configurable logic element 414.

Handshake signals between the c_br logic on configurable logic element 410 and the adder logic on configurable logic element 412 traverse two configurable routing elements 404 and 406, as compared to handshake signals between the c_br logic on configurable logic element 410 and the "ret" logic on configurable logic element 414 traversing three configurable routing elements 404, 406, and 408.

Figure 5:
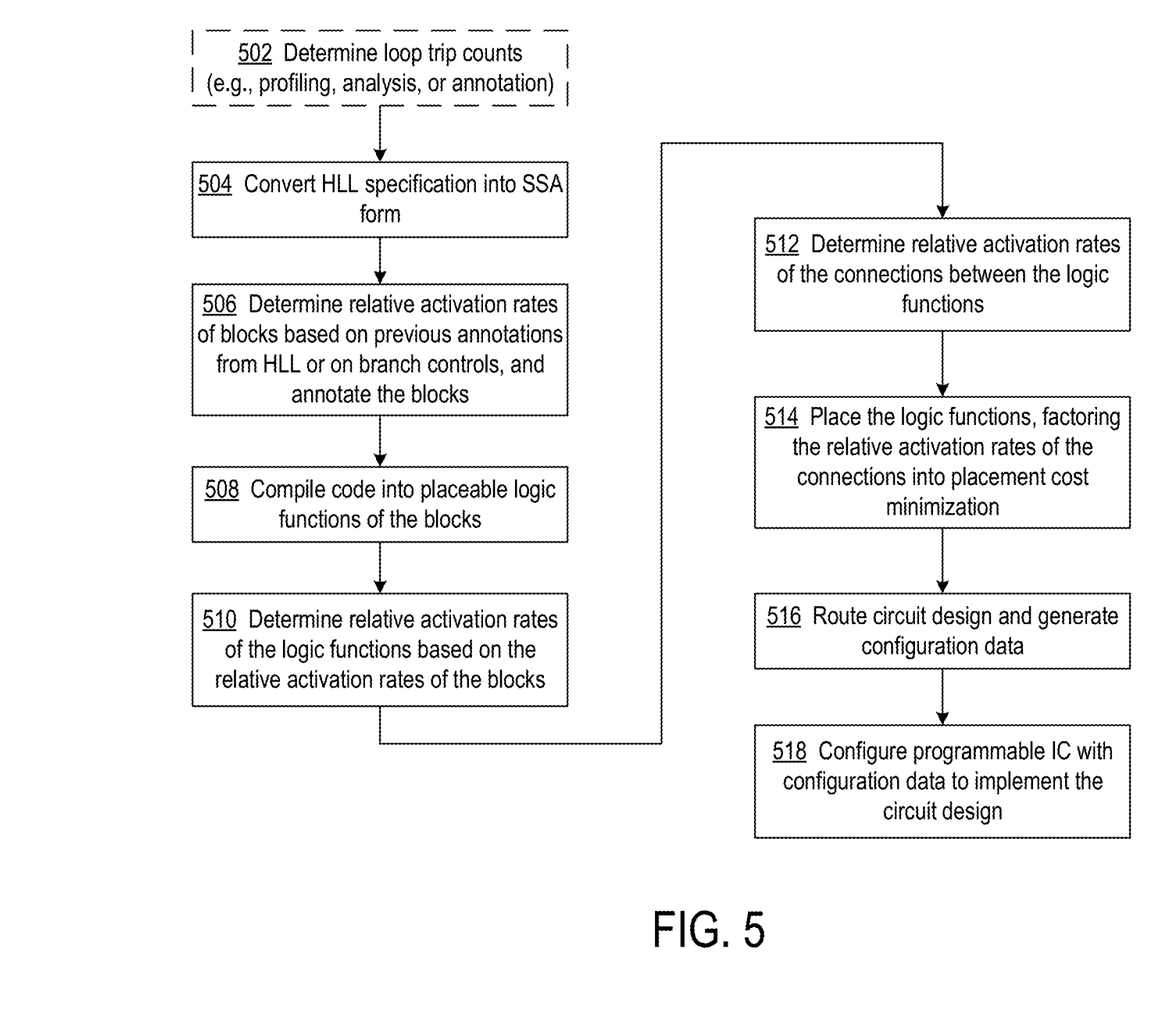
FIG. 5 shows a flowchart of an exemplary process of using relative activation rates of signals in a circuit design to guide placement of source and destination logic of those signals.

FIG. 5 shows a flowchart of an exemplary process of using relative activation rates of signals in a circuit design to guide placement of source and destination logic of those signals. According to one approach, at block 502, the circuit design can be specified in HLL program code, and loop trip counts and execution probabilities of conditional statements can be determined through profiling execution of the program code and counting numbers of times the alternative execution paths are executed, static analysis, code annotations, or any combination thereof. According to another approach, the trip count for each loop can be assigned a default value. The relative activation rate of a body of loop can be assigned the trip count determined for the loop. The HLL code can be annotated to indicate relative activate rates of loops and conditional branches.

At block 504, according to an exemplary approach, the HLL code can be converted into SSA form. At block 506, the relative activation rates of blocks of the SSA specification can be determined, based on previous annotations carried forward from the HLL code, or from analysis of branch controls in the SSA specification. The blocks of the SSA specification can be annotated with the respective relative activation rates.

At block 508, the design tool compiles the HLL code or SSA format code into logic functions that can be placed on a target IC device. The annotations in the code can be used at block 510 to determine respective relative activation rates of the logic functions. At block 512, the design tool determines respective relative activation rates of signal connections between the logic functions based on the relative activation rates determined for the logic functions. The design tool at block 514 selects placement locations on the target IC device for the logic functions. A placement cost minimization function can factor the relative activation rates of the signal connections in determining placement costs in placing the logic functions. For example, a placement algorithm driven by the minimization of total wire length could be modified to operate on a placement cost function that sums the wire length multiplied by the relative activation rate. Such a cost function would prioritize the generation of shorter routes for wires with higher activation rates.

In placing the logic functions of a synchronous design, the design tool can optionally insert one or more handshake relay stages on a signal connection from a source logic function to a destination logic function. The insertion of relay stages can be allowed if the annotated HLL code indicates insertions are allowed and the timing requirements can be satisfied with the additional relay stages.

At block 516, the design tool routes the circuit design and generates configuration data. In one application bitstream generation tools may be executed to generate configuration data for an FPGA, and in other applications a design tool can generate configuration data from which an application-specific (ASIC) can be fabricated. At block 518, a circuit can be implemented by way of configuring a programmable IC with the configuration data or fabricating, making, or producing an ASIC from the configuration data, thereby creating a circuit that operates according to the resulting circuit design.

Figure 6:
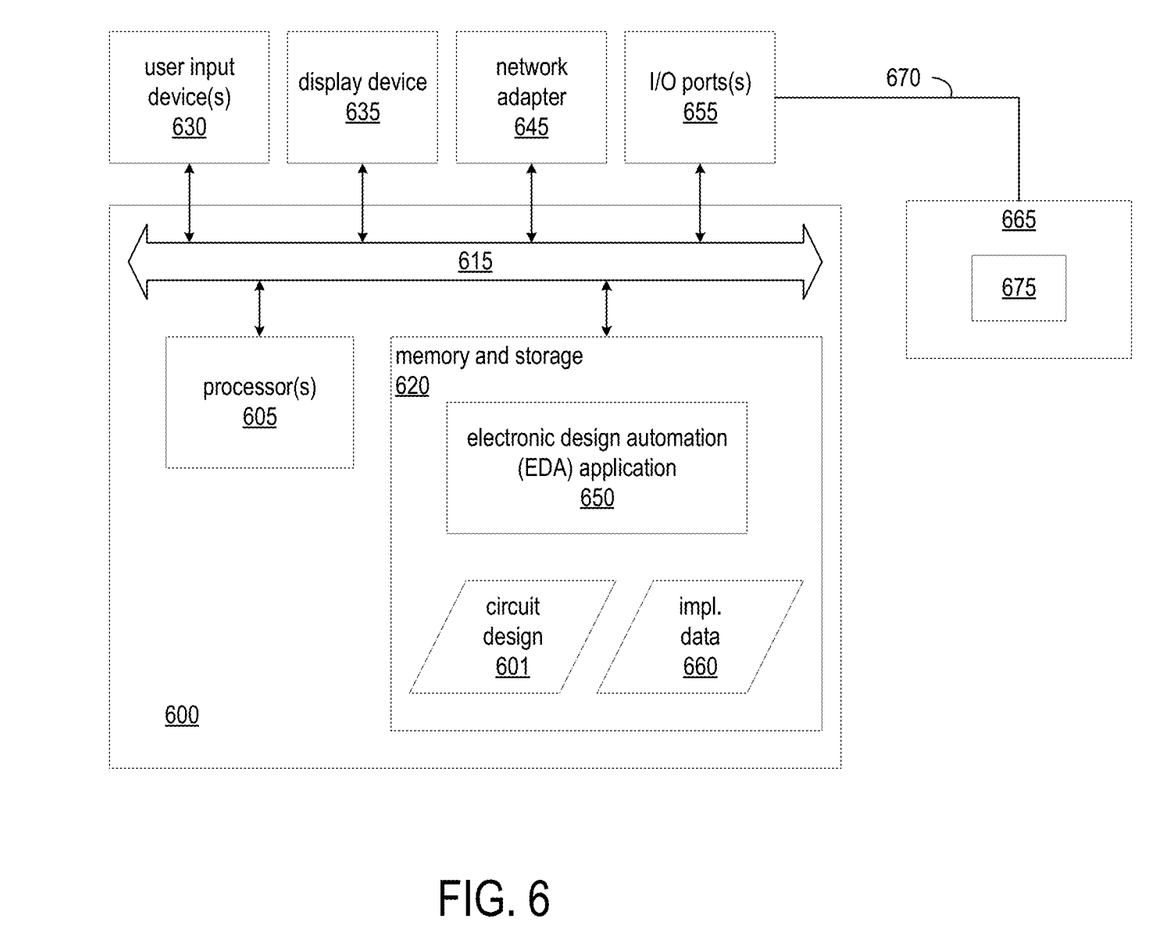
FIG. 6 is a block diagram illustrating an exemplary data processing system.

FIG. 6 is a block diagram illustrating an exemplary data processing system (system) 600. System 600 is an example of an EDA system. As pictured, system 600 includes at least one processor circuit (or "processor"), e.g., a central processing unit (CPU) 605 coupled to memory and storage arrangement 620 through a system bus 615 or other suitable circuitry. System 600 stores program code and circuit design 601 within memory and storage arrangement 620. Processor 605 executes the program code accessed from the memory and storage arrangement 620 via system bus 615. In one aspect, system 600 is implemented as a computer or other data processing system that is suitable for storing and/or executing program code. It should be appreciated, however, that system 600 can be implemented in the form of any system including a processor and memory that is capable of performing the functions described within this disclosure.

Memory and storage arrangement 620 includes one or more physical memory devices such as, for example, a local memory (not shown) and a persistent storage device (not shown). Local memory refers to random access memory or other non-persistent memory device(s) generally used during actual execution of the program code. Persistent storage can be implemented as a hard disk drive (HDD), a solid state drive (SSD), or other persistent data storage device. System 600 may also include one or more cache memories (not shown) that provide temporary storage of at least some program code and data in order to reduce the number of times program code and data must be retrieved from local memory and persistent storage during execution.

Input/output (I/O) devices such as user input device(s) 630 and a display device 635 may be optionally coupled to system 600. The I/O devices may be coupled to system 600 either directly or through intervening I/O controllers. A network adapter 645 also can be coupled to system 600 in order to couple system 600 to other systems, computer systems, remote printers, and/or remote storage devices through intervening private or public networks. Modems, cable modems, Ethernet cards, and wireless transceivers are examples of different types of network adapter 645 that can be used with system 600.

Memory and storage arrangement 620 may store an EDA application 650. EDA application 650, being implemented in the form of executable program code, is executed by processor(s) 605. As such, EDA application 650 is considered part of system 600. System 600, while executing EDA application 650 operates as the disclosed design tool, which receives and operates on circuit design 601. In one aspect, system 600 performs an implementation flow on circuit design 601, and the system 600 generates implementation data 660 based on circuit design 601.

EDA application 650, circuit design 601, circuit design 660, and any data items used, generated, and/or operated upon by EDA application 650 are functional data structures that impart functionality when employed as part of system 600 or when such elements, including derivations and/or modifications thereof, are loaded into an IC such as a programmable IC causing implementation and/or configuration of a circuit design within the programmable IC.

System 600 may optionally be coupled to a target platform 665 through I/O port 655. In another arrangement, system 600 may be coupled to target platform 665 through one of network adapters 645. In any case, system 600 is coupled to target platform 665 through a communication link 670. Communication link 670 may be implemented as any of a variety of different wired and/or wireless connections. Exemplary wired implementations of communication link 670 include, but are not limited to, point-to-point Ethernet, USB, FireWire, or the like. Exemplary wireless implementations of communication link 670 include, but are not limited to, Bluetooth®, Wi-Fi®, or the like. In the case of a wireless implementation of communication link 670, the connector of target platform 665 may be implemented as a wireless transceiver. The exemplary communication links noted within this disclosure are provided for purposes of illustration only and not intended as limitations.

Target platform 665 may be implemented as a circuit board such as a printed circuit board having circuitry implemented thereon. Target platform 665 may include a connector that couples to communication link 670. The connector may be coupled, using circuitry of target platform 665, to an IC 675. IC 675 may be coupled to target platform 665 using a socket, a receptacle, another mounting technique such as soldering IC 675 directly to target platform 665, or the like.

In any case, IC 675 couples to communication link 670 through target platform 665. In one aspect, IC 675 is a programmable IC. In another aspect, IC 675 is a system-on-chip (SOC). IC 675 may implement circuit designs that have been loaded therein. For example, system 600 may generate a configuration bitstream as described specifying a circuit design that may be provided to IC 675 and loaded therein thereby physically implementing the circuitry specified by the configuration bitstream.

Figure 7:
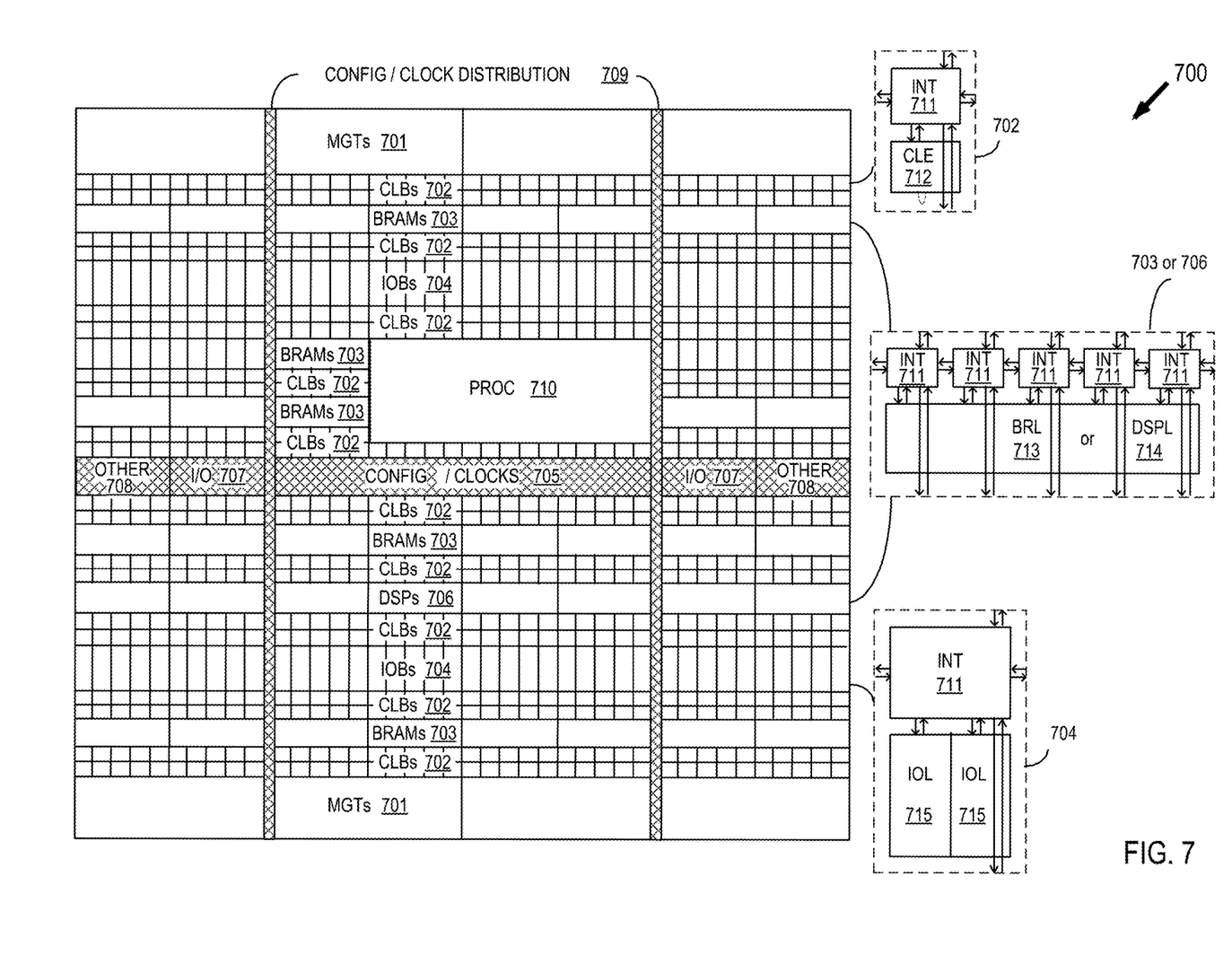
FIG. 7 shows a programmable integrated circuit (IC) on which circuits may be implemented, based on circuit designs processed according to the disclosed methods and systems.

FIG. 7 shows a programmable integrated circuit (IC) 700 on which circuits may be implemented, based on circuit designs processed according to the disclosed methods and systems. The programmable IC may also be referred to as a System On Chip (SOC) that includes field programmable gate array logic (FPGA) along with other programmable resources. FPGA logic may include several different types of programmable logic blocks in the array. For example, FIG. 7 illustrates programmable IC 700 that includes a large number of different programmable tiles including multi-gigabit transceivers (MGTs) 701, configurable logic blocks (CLBs) 702, random access memory blocks (BRAMs) 703, input/output blocks (IOBs) 704, configuration and clocking logic (CONFIG/CLOCKS) 705, digital signal processing blocks (DSPs) 706, specialized input/output blocks (I/O) 707, for example, clock ports, and other programmable logic 708 such as digital clock managers, analog-to-digital converters, system monitoring logic, and so forth. Some programmable IC having FPGA logic also include dedicated processor blocks (PROC) 710 and internal and external reconfiguration ports (not shown). Circuit designs processed according to the disclosed methods and systems can also be implemented as ASICs or on an adaptive compute acceleration platform (ACAP). An ACAP has FPGA fabric with distributed memory and hardware-programmable DSP blocks, a multicore SoC, and one or more software programmable, yet hardware adaptable, compute engines, all connected through a network on chip (NoC).

In some FPGA logic, each programmable tile includes a programmable interconnect element (INT) 711 having standardized connections to and from a corresponding interconnect element in each adjacent tile. Therefore, the programmable interconnect elements taken together implement the programmable interconnect structure for the illustrated FPGA logic. The programmable interconnect element INT 711 also includes the connections to and from the programmable logic element within the same tile, as shown by the examples included at the top of FIG. 7.

For example, a CLB 702 can include a configurable logic element CLE 712 that can be programmed to implement user logic, plus a single programmable interconnect element INT 711. A BRAM 703 can include a BRAM logic element (BRL) 713 in addition to one or more programmable interconnect elements. Typically, the number of interconnect elements included in a tile depends on the height of the tile. The illustrated BRAM tile has the same height as five CLBs, but other numbers (e.g., four) can also be used. A DSP tile 706 can include a DSP logic element (DSPL) 714 in addition to an appropriate number of programmable interconnect elements. An 10B 704 can include, for example, two instances of an input/output logic element (IOL) 715 in addition to one instance of the programmable interconnect element INT 711. As will be clear to those of skill in the art, the actual I/O bond pads connected, for example, to the I/O logic element 715, are manufactured using metal layered above the various illustrated logic blocks, and typically are not confined to the area of the input/output logic element 715.

A columnar area near the center of the die (shown shaded in FIG. 7) is used for configuration, clock, and other control logic. Horizontal areas 709 extending from this column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 7 include additional logic blocks that disrupt the regular columnar structure making up a large part of the programmable IC. The additional logic blocks can be programmable blocks and/or dedicated logic. For example, the processor block PROC 710 shown in FIG. 7 spans several columns of CLBs and BRAMs.

Note that FIG. 7 is intended to illustrate only an exemplary programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 7 are purely exemplary. For example, in an actual programmable IC, more than one adjacent column of CLBs is typically included wherever the CLBs appear, to facilitate the efficient implementation of user logic.

Though aspects and features may in some cases be described in individual figures, it will be appreciated that features from one figure can be combined with features of another figure even though the combination is not explicitly shown or explicitly described as a combination.

The methods and systems are thought to be applicable to a variety of systems for placing logic of circuit designs on target IC devices. Other aspects and features will be apparent to those skilled in the art from consideration of the specification. It is intended that the specification and drawings be considered as examples only, with a true scope of the invention being indicated by the following claims.

What is claimed is:

1. A method comprising:
   determining respective relative activation rates of control paths in a high-level language (HLL) program by a design tool, wherein the HLL program specifies a circuit design;
   compiling the HLL program into logic functions by the design tool;
   determining respective relative activation rates of signal connections between the logic functions by the design tool, based on the relative activation rates of the control paths in the HLL program; and
   selecting placement locations on an integrated circuit device for the logic functions by the design tool using a placement cost minimization function that factors the relative activation rates of the signal connections into placement costs.

2. The method of claim 1, further comprising:
   converting the HLL program into a static single assignment (SSA) specification;
   wherein the determining respective relative activation rates of the control paths in the HLL program includes determining respective relative activation rates of blocks of the SSA specification based on branch controls in the SSA specification;
   annotating the blocks of the SSA specification with the respective relative activation rates;
   wherein the compiling includes determining the logic functions that implement the blocks of the SSA specification; and determining respective relative activation rates of the logic functions based on the respective relative activation rates of the blocks.

3. The method of claim 2, wherein the branch controls include a loop control over a loop in the HLL program, and the blocks include a loop body block that represents a body of the loop, and the method further comprising:
determining a trip count of the loop; and
determining the relative activation rate of the loop body block based on the trip count.

4. The method of claim 3, wherein the determining the trip count includes profiling execution of the HLL specification and counting iterations of the loop.

5. The method of claim 3, wherein the determining the trip count includes assigning a default value to the trip count.

6. The method of claim 2, wherein the branch controls include an if control, and the blocks include two or more alternative blocks that represent statements in alternative execution paths in the HLL program that are controlled by the if control, and the method further comprising:
determining respective probabilities of executing the alternative execution paths; and
wherein determining the respective relative activation rates of the blocks of the SSA specification includes, determining the respective relative activation rate of each of the two or more alternative blocks as a product of the respective relative activation rate of a predecessor block of the if control and the respective probability of executing the alternative execution path of the alternative block.

7. The method of claim 6, wherein determining the respective probabilities includes profiling execution of the HLL specification and counting numbers of times the alternative execution paths are executed.

8. The method of claim 2, wherein:
determining the logic functions that implement the blocks of the SSA specification includes determining logic functions that implement each branch control; and
determining the respective relative activation rates of signal connections between the logic functions includes determining the respective relative activation rate of a signal connection from a logic function of the branch control and a logic function of destination block of the branch control as the relative activation rate of the destination block.

9. The method of claim 8, wherein the logic functions that implement a branch control of the branch controls in the SSA specification include a conditional branch function that activates one of two or more alternative signal connections.

10. The method of claim 8, wherein the logic functions that implement a branch control of the branch controls in the SSA specification include a multiplexer function that selects input from two or more alternative signal connections.

11. The method of claim 10, wherein the logic functions that implement a branch control of the branch controls in the SSA specification include a merge function that selects input from two or more alternative signal connections and controls selection by the multiplexer function.

12. The method of claim 2, wherein:
the circuit design is a synchronous circuit design; and
selecting placement locations includes inserting one or more handshake relay stages on a signal connection from a source logic function to a destination logic function in response to:
satisfaction of timing requirements based on selected placement locations of the source logic function and the destination logic function and insertion of the one or more handshake relay stages on the signal connection, and an annotation in the SSA specification approving insertion of handshake relay stages.

13. The method of claim 1, wherein the integrated circuit device is an asynchronous integrated circuit device.

14. The method of claim 1, wherein the selecting placement locations includes selecting placement locations in programmable logic for the logic functions.

15. The method of claim 1, further comprising:
generating configuration data that implements the circuit design; and
configuring a programmable IC with the configuration data to implement the circuit design on the programmable IC.

16. A system comprising:
one or more processors;
a memory arrangement configured with instructions that when executed by the one or more processors cause the one or more processors to implement an electronic design automation (EDA) tool that performs operations including:
determining respective relative activation rates of control paths in a high-level language (HLL) program, wherein the HLL program specifies a circuit design;
compiling the HLL program into logic functions;
determining respective relative activation rates of signal connections between the logic functions, based on the relative activation rates of the control paths in the HLL program; and
selecting placement locations on an integrated circuit device for the logic functions using a placement cost minimization function that factors the relative activation rates of the signal connections into placement costs.

17. The system of claim 16, wherein:
the memory arrangement is configured with instructions that when executed by the one or more processors cause the one or more processors to convert the HLL program into a static single assignment (SSA) specification;
the instructions for determining respective relative activation rates of the control paths in the HLL program include instructions that determine respective relative activation rates of blocks of the SSA specification based on branch controls in the SSA specification;
the memory arrangement is configured with instructions that when executed by the one or more processors cause the one or more processors to annotate the blocks of the SSA specification with the respective relative activation rates;
the instructions for compiling include instructions that determine the logic functions that implement the blocks of the SSA specification; and
the memory arrangement is configured with instructions that when executed by the one or more processors cause the one or more processors to determine respective relative activation rates of the logic functions based on the respective relative activation rates of the blocks.

18. The system of claim 17, wherein the branch controls include a loop control over a loop in the HLL program, and the blocks include a loop body block that represents a body of the loop, and the memory arrangement is configured with instructions that when executed by the one or more processors cause the one or more processors to perform operations including:
determining a trip count of the loop; and determining the relative activation rate of the loop body block based on the trip count.

19. The system of claim 17, wherein the branch controls include an if control, and the blocks include two or more alternative blocks that represent statements in alternative execution paths in the HLL program that are controlled by the if control, and the method further comprising:
   determining respective probabilities of executing the alternative execution paths; and
   wherein determining the respective relative activation rates of the blocks of the SSA specification includes, determining the respective relative activation rate of each of the two or more alternative blocks as a product of the respective relative activation rate of a predecessor block of the if control and the respective probability of executing the alternative execution path of the alternative block.

20. The system of claim 19, wherein determining the respective probabilities includes profiling execution of the HLL specification and counting numbers of times the alternative execution paths are executed.

\* \* \* \* \*